C. WHITE.
TREATMENT OF MINERAL OILS AND RESIDUES FOR THE PRODUCTION OF LOWER BOILING HYDROCARBONS.
APPLICATION FILED MAY 13, 1914.
1,226,041.
Patented May 15, 1917.
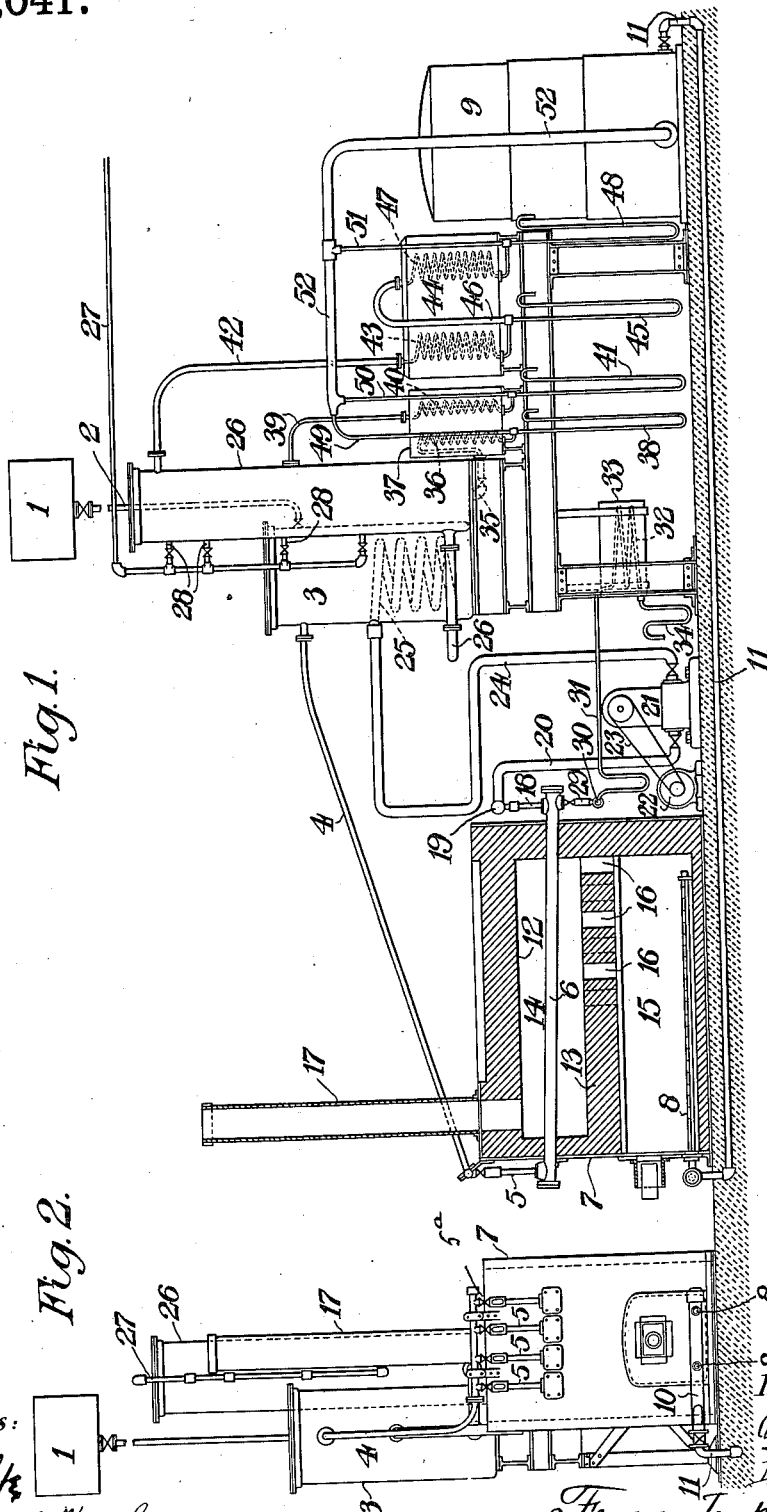

UNITED STATES PATENT OFFICE.

CARTER WHITE, OF LONDON, ENGLAND.

TREATMENT OF MINERAL OILS AND RESIDUES FOR THE PRODUCTION OF LOWER-BOILING HYDROCARBONS.

1,226,041.   Specification of Letters Patent.   Patented May 15, 1917.

Application filed May 13, 1914. Serial No. 838,230.

*To all whom it may concern:*

Be it known that I, CARTER WHITE, subject of the King of Great Britain, residing at 10 Bush Lane, in the city and county of London, England, have invented certain new and useful Improvements in or Relating to the Treatment of Mineral Oils and Residues for the Production of Lower-Boiling Hydrocarbons, of which the following is a specification.

This invention relates to an improved process of treating mineral oils or residues for the purpose of producing therefrom lower boiling hydrocarbons of the paraffin series or products of low boiling point and low flash point of approximately the character of petrol.

According to the invention I bring the oil or residue in a liquid state and without addition of steam, on to quick-lime (preferably in the form of small pieces or lumps) which is heated to a suitable temperature in a suitable retort or chamber. I have found 550° C.–575° C. to be a very suitable temperature but I do not restrict myself to this temperature as I may work at as low as about 400° or as high as 650° C. The oil or residue may be sprayed or trickled on to the lime or be admitted thereto in a thin sheet or film or be otherwise admitted thereto, preferably in a distributed condition.

The oil on coming into contact with the hot lime volatilizes, and the vapors of oil thus produced are absorbed into the lime, where they undergo molecular re-arrangement, with consequent production of a large proportion of lower hydrocarbons of lower boiling point and lower flash point.

I find that if these newly produced vapors of lower hydrocarbons are allowed to remain in the site of their generation, they themselves again undergo decomposition, with production of still lower boiling and flashing hydrocarbons, most of which are not condensable at ordinary temperature.

According to a further part of the invention, in order to obviate this, I may employ a vacuum pump or other exhausting apparatus attached to the retort or lime chamber, by which means the molecules of the vapors themselves, under the reduced pressure, are drawn away quickly from the source of their production, and as, under reduced pressure, the numbers of molecules of hydrocarbons are much less in a given space than under normal conditions of pressure, there are fewer molecules of the petrol vapors present, so that the possible reduction to lower and gaseous hydrocarbons is thereby diminished.

The vapors from the lime retort or chamber may be condensed in any suitable way, and a liquid can thus be obtained containing a large proportion of hydrocarbon of low boiling point and flash point. With crude paraffin oil for example I have obtained by the above treatment a liquid containing from 20 to 25 per cent. of hydrocarbon having a boiling point and flash point approximately those of petrol.

The petrol or lower boiling product may be removed from the liquid by distillation or fractionation, and the residue may be again subjected to the action of the heated lime in order to produce a further yield of petrol or low boiling hydrocarbon therefrom.

If desired the vapors from the retort or chamber may be led direct to fractionating apparatus instead of being first condensed. The lime after it has been in use contains a certain amount of carbon, and the lime may be regenerated from time to time as required, by heating it in a current of air, in order to free it from carbon which becomes deposited therein during the process or from impurities deposited from the oil.

If the oil or residue to be subjected to the process of the invention contains an appreciable percentage of low boiling hydrocarbons it should be subjected to a preliminary heating or distillation in order to remove the same before the lime treatment.

Any desired number of lime retorts or chambers may be used, and they may be horizontal, vertical or inclined.

The accompanying drawings illustrate by way of example a plant for carrying out the invention, Figure 1 being a diagrammatic side elevation of the apparatus, with the retort heating furnace in longitudinal section.

Fig. 2 is an end elevation of the said furnace, showing also the oil supply tank, preheating vessel and dephlegmator.

1 is an overhead tank for supplying the oil through a valved pipe 2, preheating vessel 3, overflow pipe 4 and a series of valved branch pipes 5, 5, 5, 5 to a corresponding number of iron pipes 6 containing a layer of quicklime in small lumps, these pipes being mounted in a furnace 7 heated by Bunsen type gas burners 8 supplied with gas from a gas holder 9 by a pipe 10 and valved pipe 11. The furnace is lined with refractory material 12 and divided by a refractory partition 13 into upper and lower chambers 14, 15, communicating by openings 16 for the passage of the combustion gases to the chamber 14 in which the pipes 6 are mounted and thence to the chimney 17.

The rear ends of the lime retort pipes 6 are each joined by a pipe 18 to a common pipe 19 which is connected by a valved pipe 20 to the suction side of an exhaust pump 21 driven by a motor 22 and belt 23.

From the pump, the gases may pass to suitable condensing means, with or without being fractionated.

Preferably, however, the pump 21 is connected by a valved pipe 24 to a coil 25 in the preheating vessel 3 and which leads by a pipe 26 to the bottom of the dephlegmator 26 of which 27 represents the cooling water supply pipe and 28, 28, 28, 28, the valved connections to the ordinary water cooling coils.

The retort pipes 6 are also each connected at the rear end by a valved pipe 29 and a common pipe 30 to a trapped pipe 31 for any liquid residue that issues from the pipes 6, this pipe 31 leading to a cooling coil 32 in a cooling vessel 33 and discharging to the outside by a trapped pipe 34.

The dephlegmator 26 is connected at bottom by a valved pipe 35 to a cooling coil 36 in a cooling vessel 37, this coil discharging through a U-pipe 38 for delivering the first fraction of the condensed vapors. A second pipe 39 leads from about midway of the height of the dephlegmator to another cooling coil 40 in the vessel 37 and delivers the second fraction through a U-pipe 41. A third pipe 42 leads from the top of the dephlegmator to a cooling coil 43 in a cooling vessel 44 which delivers the third fraction through a U-pipe 45, the bottom of coil 43 also communicating by a bent pipe 46 with another coil 47 in the vessel 44, which latter coil delivers the fourth fraction through a U-pipe 48. The U-pipes for the first, second and fourth fractions are connected by pipes 49, 50, 51 with a pipe 52 for conducting away uncondensed gas to the gas holder 9 from which the burners 8 of the furnace are supplied.

In operation with this apparatus the heavy oil supplied from the tank 1 fills the preheating vessel 3 and passes by the pipes 4 and 5 to the retort pipes 6 charged with quick-lime heated to the required temperature of say 550° to 575° C., the valves 5ᵃ of the pipes 5 being regulated to give the desired amount of flow. The vapors produced by the action of the heated lime on the oil as mentioned pass away by the pipes 18 and 20, their evacuation being assisted by the pump 21, and in passing through the coil 25 they heat up the oil in the preheater 3. From the coil 25 the vapors pass to the dephlegmator 26 from which the various fractions are led and condensed as explained and are delivered by the pipes 38, 41, 45, and 48, any uncondensed gases passing to the gas holder 9 by the pipes 49, 50, 51 and 52. Any liquid residue from the lime retort pipes 6 passes away by the pipes 29, 30, 31, and is delivered by the pipe 34 after passing through the cooling coil 32. Such residue can be returned to the supply tank 1 if desired.

What I claim and desire to secure by Letters Patent is:—

1. Process for the treatment of mineral oils or residues for the production of lower boiling products, comprising bringing the oil or residue in a liquid state on to quicklime heated to a temperature of between about 400° to about 650° C., in the absence of added water vapor, the lime remaining in an unslaked condition during the carrying on of the process.

2. Process for the treatment of mineral oils or residues for the production of lower boiling products, comprising bringing the oil or residue in a liquid state on to quicklime heated to a temperature of about 550° to 575° C., in the absence of added water vapor, the lime remaining in an unslaked condition during the carrying on of the process.

3. Process for the treatment of mineral oils or residues for the production of lower boiling products, comprising bringing the oil or residue in a liquid state on to quicklime containing carbon and heated to a temperature of about 550° to 575° C., in the absence of added water vapor, the lime remaining in an unslaked condition during the carrying on of the process.

4. Process for the treatment of mineral oils or residues for the production of lower boiling products, comprising bringing the oil or residue in a liquid state on to quicklime heated to a temperature of between about 400° to about 650° C., in the absence of added water vapor, the lime remaining in unslaked condition during the carrying on of the process, and applying suction to draw away the vapors generated, for the purpose of restraining reduction of same into undesired low forms.

5. Process for the treatment of mineral oils or residues for the production of lower boiling products, comprising bringing the oil or residue in a liquid state on to quicklime heated to a temperature of about 550° to 575° C., in the absence of added water vapor, the lime remaining in unslaked condition during the carrying on of the process, and applying suction to draw away the vapors generated, for the purpose of restraining reduction of same into undesired low forms.

6. Process for the treatment of mineral oils or residues for the production of lower boiling products, comprising bringing the oil or residue in a liquid state on to quicklime heated to a temperature of between about 400° to about 650° C., in the absence of added water vapor, the lime remaining in unslaked condition during the carrying on of the process, condensing the resulting vapors and distilling the same to extract the petrol or lower boiling portion thereof.

7. Process for the treatment of mineral oils or residues for the production of lower boiling products, comprising bringing the oil or residue in a liquid state on to quicklime heated to a temperature of between about 400° to about 650° C., in the absence of added water vapor, the lime remaining in unslaked condition during the carrying on of the process, and fractionating the resulting vapors to obtain the petrol or lower boiling portion thereof.

In witness whereof I have hereunto signed my name in the presence of two subscribing witnesses.

CARTER WHITE.

Witnesses:
ALFRED B. CAMPBELL,
H. D. JAMESON.